Nov. 4, 1969      G. A. TINNERMAN      3,476,163

CONSTANT TORQUE SHEET METAL FASTENER

Original Filed Sept. 20, 1965

INVENTOR.
GEORGE A. TINNERMAN
BY
ATTORNEY

United States Patent Office 3,476,163
Patented Nov. 4, 1969

3,476,163
CONSTANT TORQUE SHEET METAL FASTENER
George A. Tinnerman, 17864 Beach Road,
Lakewood, Ohio 44107
Original application Sept. 20, 1965, Ser. No. 489,467, now Patent No. 3,382,753, dated May 14, 1968. Divided and this application May 14, 1968, Ser. No. 728,988
Int. Cl. F16b 39/30
U.S. Cl. 151—14     1 Claim

ABSTRACT OF THE DISCLOSURE

A sheet metal nut has an aperture bounded by an edge engageable with the helical thread of a threaded stud. At one or more points, the edge is deformed axially to engage frictionally the side of the thread of the threaded fastener so as to provide prevailing or constant torque. In the specific embodiment, the aperture is bounded by the edges of a plurality of tongues struck out of the base of the nut and formed with helical edges to conform to the thread of the threaded stud, with the end of an edge of each tongue deflected axially at one end to be engaged and depressed by the threaded fastener.

---

This application is a division of Ser. No. 489,467, filed Sept. 20, 1965, for Spring Steel Fastener, now Patent No. 3,382,753.

THE INVENTION

This invention relates to fasteners and more particularly to fasteners which may be fashioned from spring sheet material such as steel, and which is provided with an integral base and stud engaging and supporting portions to maintain proper alignment with and during assembly on a stud. The forms of the invention disclosed herein constitute improvements over my allowed copending application, Ser. No. 204,889, filed June 25, 1962, now Patent No. 3,207,022.

In the past, spring steel fasteners constituted a base in the form of a flat or arched spring washer surrounding opposed prongs inclined upwardly from the base and toward one another with their free ends spaced apart for the passage of a stud shank between them to be gripped thereby to provide a complete fastener eliminating separate parts such as a lock washer or the like.

By this invention, as illustrated and described, the tongues or stud engaging portions are formed with helical edges on their ends to engage the helical threads on a threaded stud. At one or more points, the edge of a tongue is deflected axially out of a helical path, so that a prevailing or constant torque is provided by its frictional engagement with the side of the thread of the stud.

DRAWINGS

Figure 1:
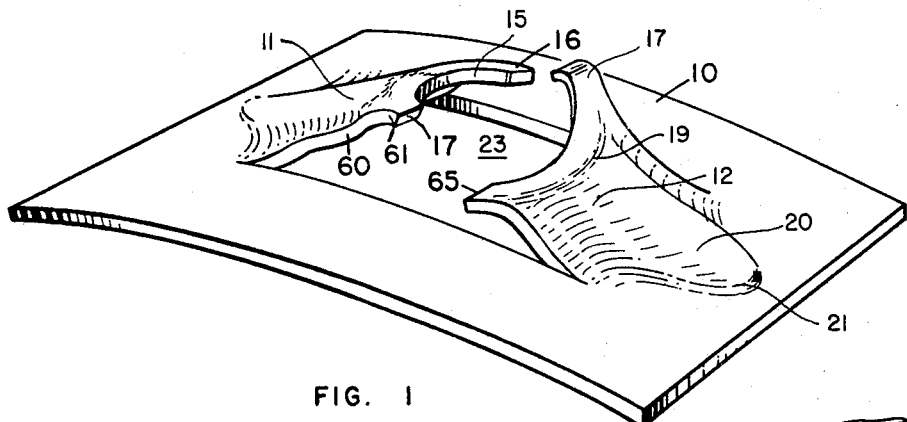
FIGURE 1 is a perspective view of a sheet metal nut embodying the invention.
Figure 2:
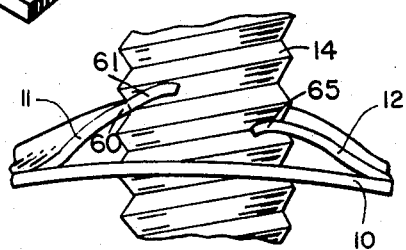
FIGURE 2 is an elevational view showing the nut engaged by a threaded stud.

FIGURES 1 and 2 illustrate a form of the invention in which the arched rectangular base plate 10 formed of spring sheet steel is provided with a plurality of opposed tongues 11 and 12, the said tongues having arcuate edges 15 between the prongs 16 and 17. These pairs of tongues extend inwardly so their arcuate edges form a passage 23 therebetween for receiving the shank of a threaded stud 14.

Each tongue is outwardly curved to form a rigidifying crown 19 and is formed with an outwardly rising longitudinal rib 20 which flares laterally to merge with the crown 19 and tapers rearwardly and extends to a terminal end 21 in the base 10 at a point substantially beyond the line of juncture of the tongue and base, thus forming a rigidifying bridge extending substantially from an end of the base to the terminal open end of the tongue.

Each tongue has means providing prevailing or constant torque through novel bearing engagement of the prongs of the tongues with the root of the stud thread. Such means may include deforming the tongue at and around prong 17 at 60 to project it in an upward direction, as at 61, and out of phase with the thread pitch at least one-half the pitch distance of the thread, thereby insuring a constant bearing against the underface of the thread of the stud 14 while the balance of the tongue edges defining the opening 23 and the extremities of the tongues reach into the root of the thread. The degree of torque can be controlled by the degree of deformation and the pressure of the prong extremity on the thread, together with the pitch distance of the thread. The point of entry at 65 of the screw head into engagement with the tongue elements constitutes a free entry as the screw initially engages the fastener, but as the screw is rotated, the extremities or prongs of the tongues, rising in a helical path counter clockwise in FIGURE 1, progressively engage the thread except at the deformed portion 61 of tongue 17, which then exerts its bearing pressure directly against the underface of the thread.

Figures 3, 4:
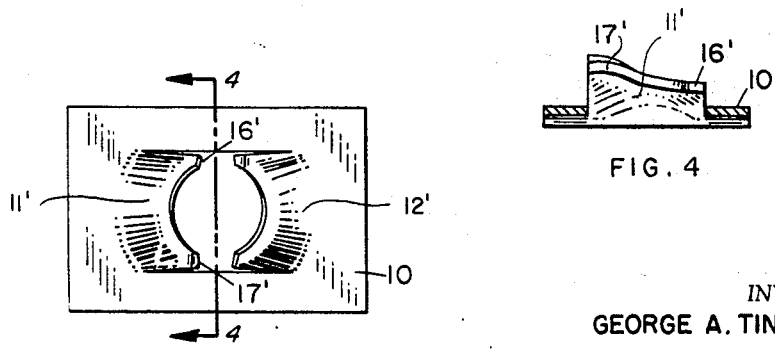
FIGURE 3 is a plan view of another type of sheet metal nut which embodies the invention.
FIGURE 4 is a cross section on line 4—4 of FIGURE 3.

The modification in FIGURES 3 and 4 shows the invention applied to a standard fastener having a base 10 and a pair of opposed tongues 11' and 12', but provided with shortened tips 16' and 17' for engaging the thread of a threaded stud entering the opening in the passage between the tongues. The tip portion of the tongue 17' is deformed in a manner similar to that of the prong at 60 and 61 of FIGURE 1 to provide prevailing or constant torque through bearing engagement of the deformed points with the root of the stud thread.

The foregoing description and accompanying drawings are considered as illustrative only of the principles of the invention and the spring steel fastener of the present invention is not to be regarded as limited by the above described embodiments.

I claim:
1. A sheet metal nut having a base and an aperture therein, said nut comprising two tongues, each formed from the sheet material of the nut by cuts extending from the end of the tongue toward its base and pressed outwardly from the base to provide an inclined tongue with its free end spaced from the base of said nut, the ends of said tongues being curved on a radius coaxial with said aperture and with a stud threaded therein, the edge of each end lying in a spiral curve substantially conforming to the thread of said stud throughout the major portion of said curve, the edge of said aperture spaced from the trailing end being deflected axially away from said base and out of said spiral curve with said trailing end deflected toward said base to form a curved portion to engage the side of the thread of the stud and exert greater friction at that point than throughout the remainder of said edge.

References Cited

UNITED STATES PATENTS

| 1,928,469 | 9/1933 | Tinnerman | 85—36 |
| 1,978,364 | 10/1934 | Hotchkin | 85—36 |
| 2,336,094 | 12/1943 | Hall | 151—30 |
| 3,207,022 | 9/1965 | Tinnerman | 85—36 |

EDWARD C. ALLEN, Primary Examiner

U.S. Cl. X.R.

85—36